(No Model.) 5 Sheets—Sheet 1.

G. DE LAVAL.
MOTOR FOR OPERATING CENTRIFUGAL SEPARATORS.

No. 379,690. Patented Mar. 20, 1888.

(No Model.) 5 Sheets—Sheet 2.
G. DE LAVAL.
MOTOR FOR OPERATING CENTRIFUGAL SEPARATORS.
No. 379,690. Patented Mar. 20, 1888.
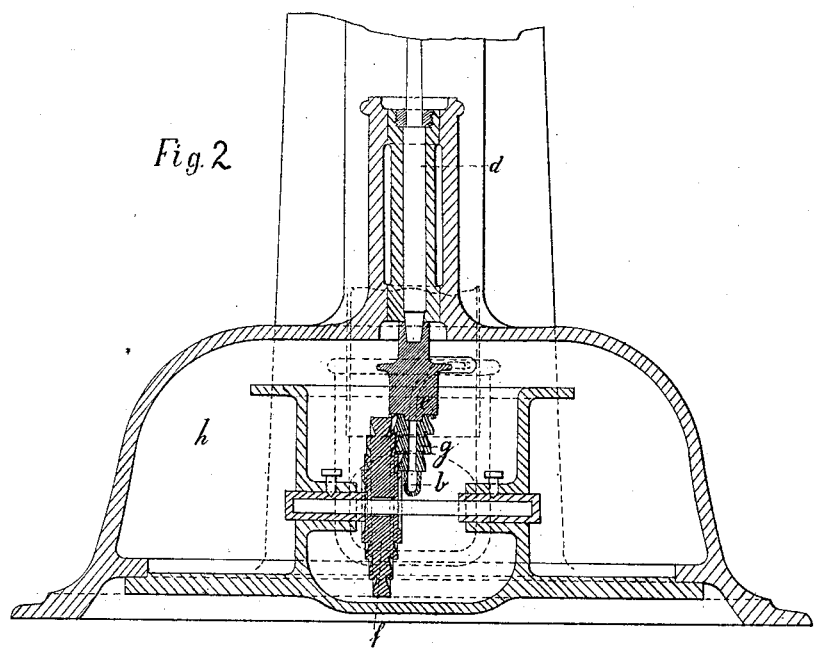

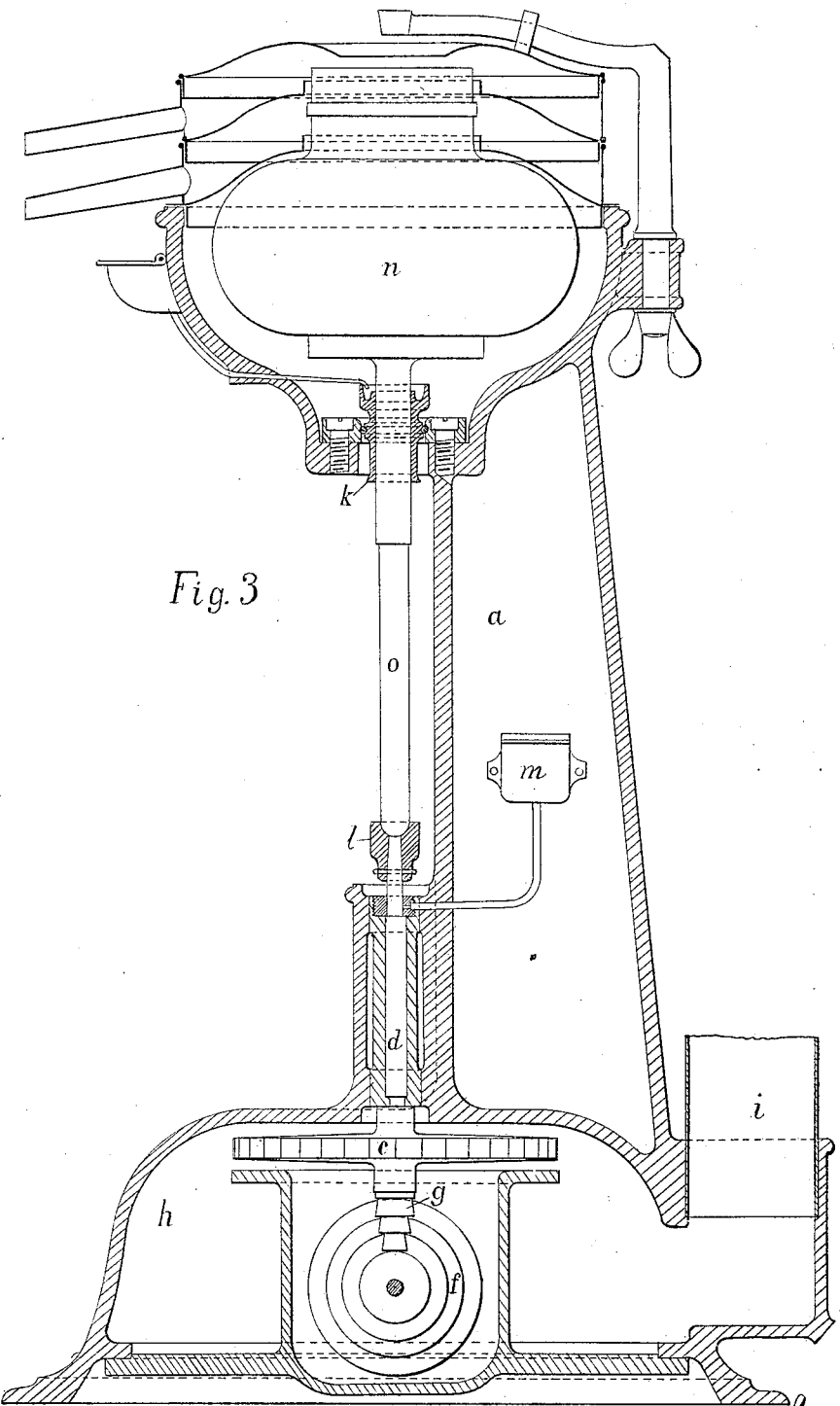

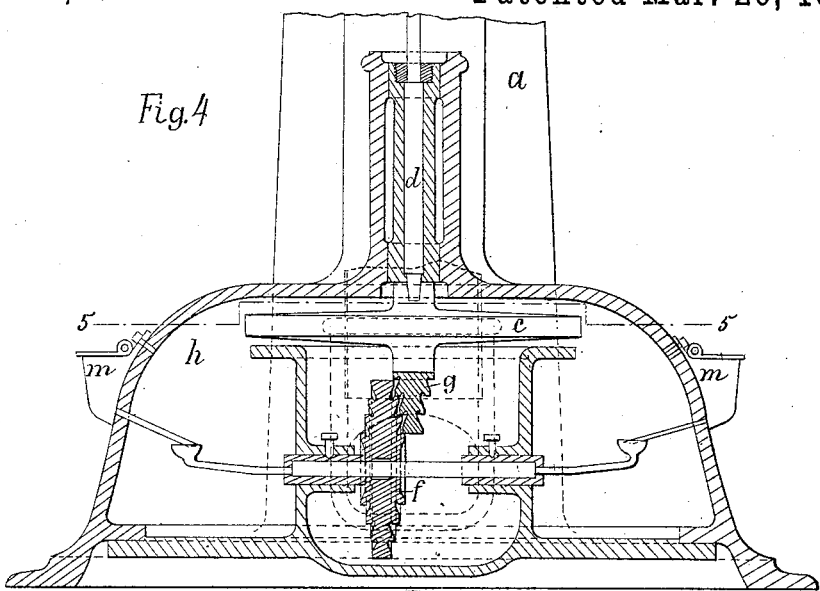
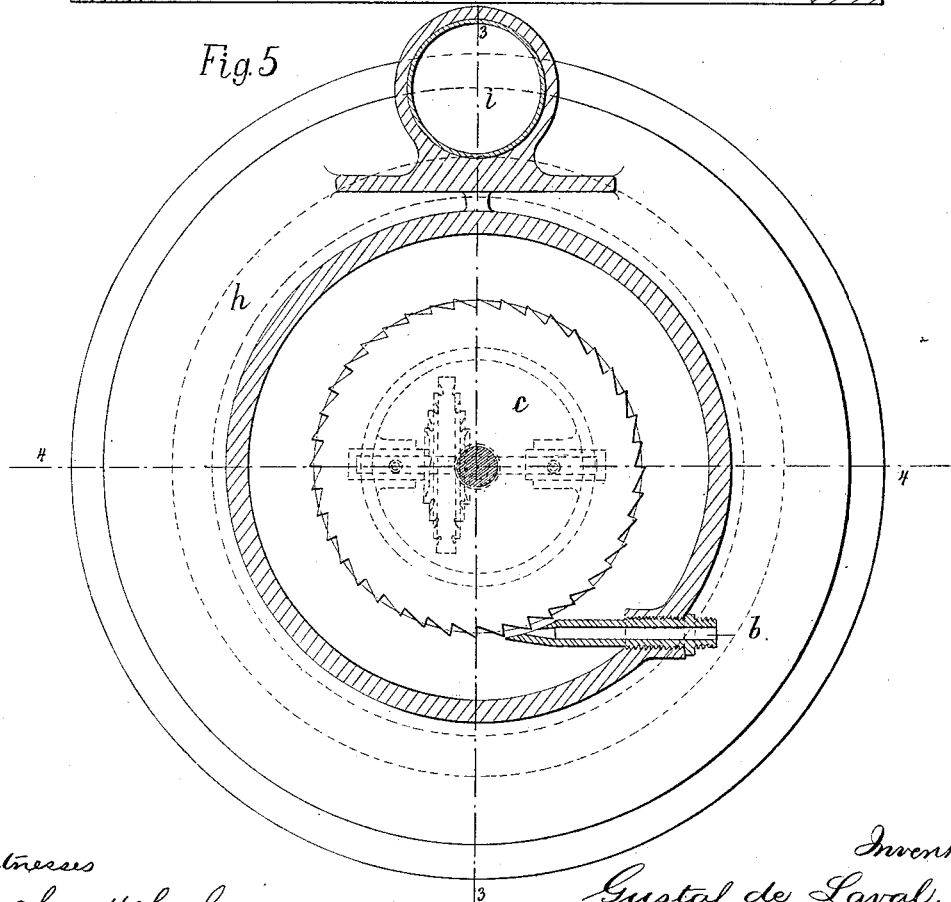

(No Model.) 5 Sheets—Sheet 5.

G. DE LAVAL.
MOTOR FOR OPERATING CENTRIFUGAL SEPARATORS.

No. 379,690. Patented Mar. 20, 1888.

Witnesses
Chas H Smith
W. L. Serrell

Inventor
Gustaf de Laval
per Lemuel W. Serrell
att

UNITED STATES PATENT OFFICE.

GUSTAF DE LAVAL, OF STOCKHOLM, SWEDEN.

MOTOR FOR OPERATING CENTRIFUGAL SEPARATORS.

SPECIFICATION forming part of Letters Patent No. 379,690, dated March 20, 1888.

Application filed December 8, 1886. Serial No. 220,952. (No model.)

*To all whom it may concern:*

Be it known that I, GUSTAF DE LAVAL, a subject of the King of Sweden, and a resident of Stockholm, Sweden, have invented certain Improvements in Motors for Operating Centrifugal Separators, of which the following is a specification.

Figure 1:
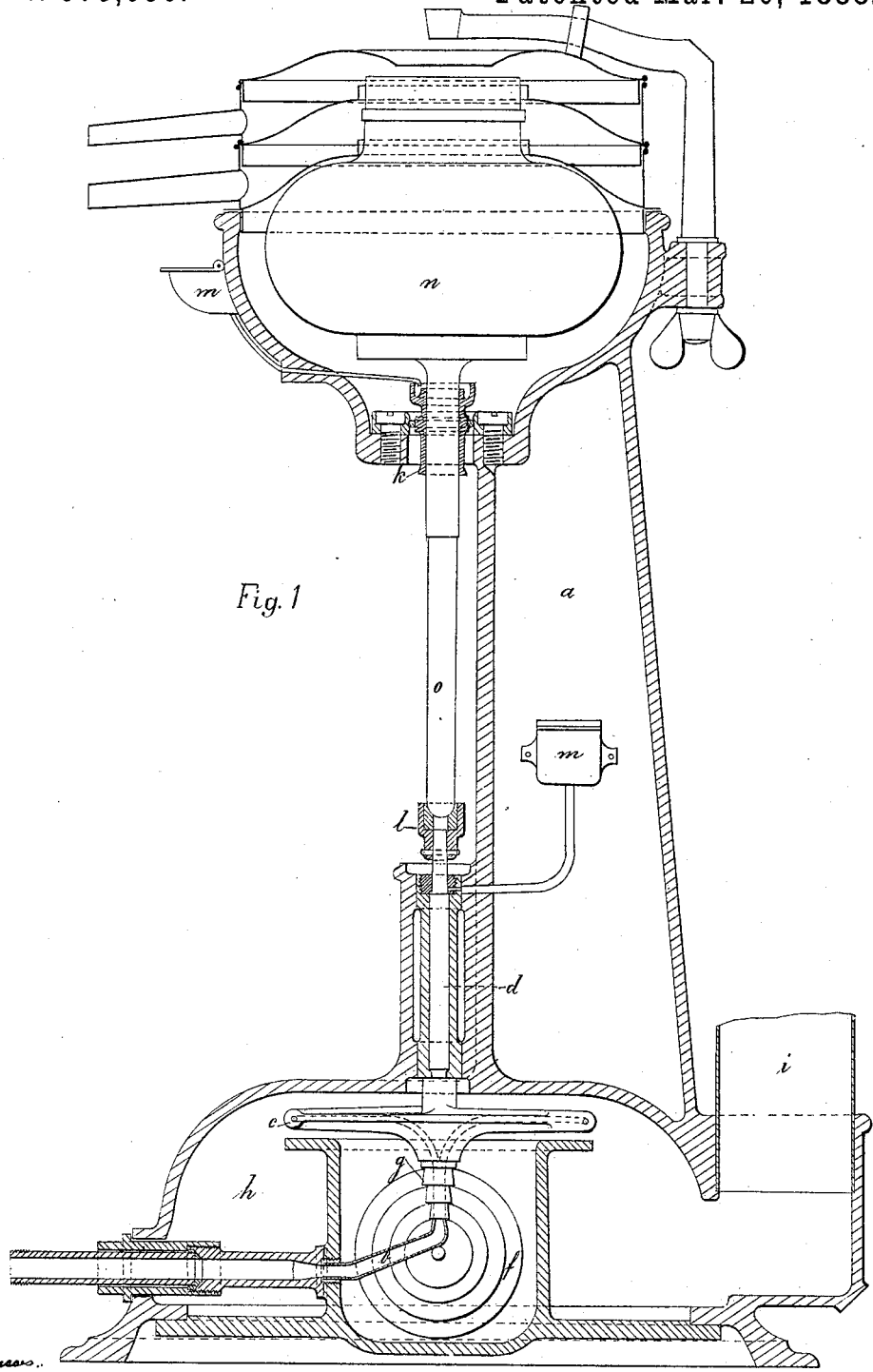
Figure 6:
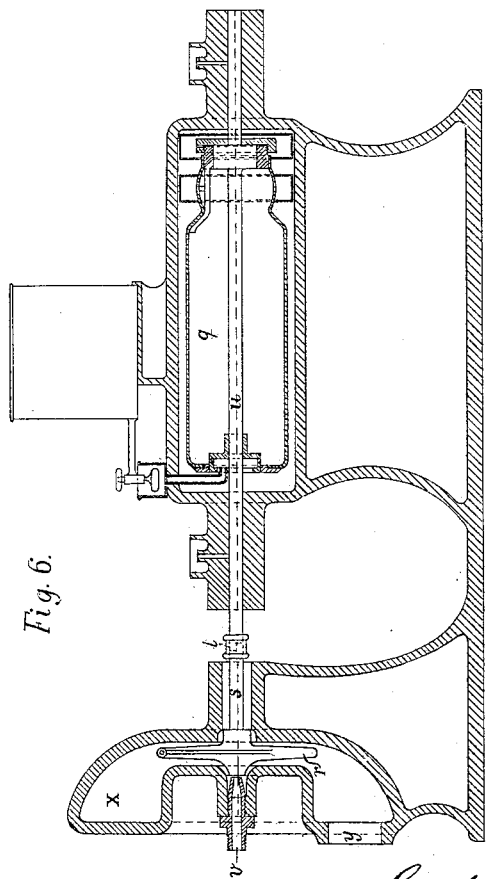

Centrifugal separators have been driven by belts and pulleys and by friction-wheels, but the inequality in the driving force causes the centrifugal apparatus to shake or vibrate and thereby retard the centrifugal separating action; besides this, the speed cannot be increased beyond that derived from the motor. I combine with the centrifugal separator a steam-wheel in the form of a turbine or a bucket wheel, the shaft of which is in line with the shaft of the separator, so that the rotating power acts direct and both the steam-wheel and the separator spin like a top, and the faster they revolve the more steady is the motion, and the speed is only limited by that of the issuing steam-jets that give motion to the parts.
In the annexed drawings, Figure 1 is a partial vertical section showing the separator with a turbine steam-wheel, and Fig. 2 a vertical section of the lower part of the same at right angles to the section in Fig. 1. Fig. 3 is a vertical section of a combination of a separator with a steam-wheel at the line 3 3 in Fig. 5. Fig. 4 shows the lower part thereof in section at the line 4 4 in Fig. 5, and Fig. 5 is a horizontal section at the line 5 5 in Fig. 4, without the oil-boxes and conduits. Fig. 6 is a longitudinal vertical section, and Fig. 7 an end view, of the improvement as applied to a horizontal separator.

In Fig. 1, $n$ is the separator-vessel with its spindle $o$, which spindle, by means of the coupling 1, is connected with the shaft $d$, running in fixed bearings and carrying the turbine $c$. This shaft $d$ rests with a step-formed conical pivot, $g$, on a step-formed conical wheel, $f$, mounted in bearings. Through the hollow pivot $g$ the steam from a boiler is led by the pipe $b$ into the turbine $c$. The turbine is inclosed in the case $h$ of the stand, specially made for the purpose, and the exhaust-steam escapes through the pipe $i$. The bearing $k$ of the separator is supported by the upright portion $a$ of the stand. $m\ m$ are oil-boxes.

In Figs. 3 to 5 the same letters designate the same parts as in Figs. 1 and 2, $c$ being a steam-wheel and $b$ the steam-supply pipe, which however terminates as a nozzle adjacent to the periphery of the steam-wheel, so as to revolve the wheel by the action of the steam on the edge thereof. When employing this mode of driving centrifugal cream-separators, it is only necessary to open a cock in the steam-pipe from the boiler as much as wanted, and the steam rushing out causes the turbine or the wheel to rotate and with it the separator. The arrangements shown are also very convenient for driving centrifugal emulsifiers, and also separators for determining the fat in milk, known as lactometers, which apparatus are mounted in the same way as the vertical cream-separators.

By my improvements the wheel and separator start comparatively slowly and the speed is rapidly augmented, and the wheel and separator spin without vibration, and the velocity is only limited by the speed of the issuing steam and the slight friction of the parts; hence the separating operation proceeds with the greatest rapidity and there is no vibration to check the separation by agitating the materials, as usual in centrifugal separators.

Figure 7:
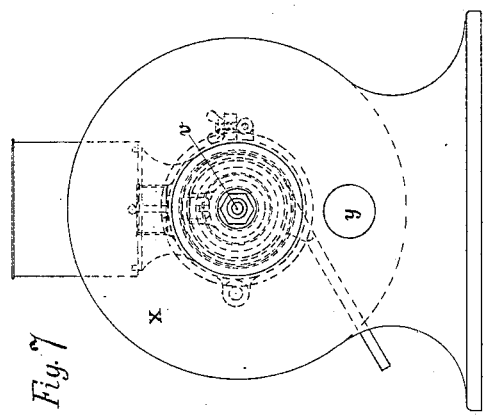

Figs. 6 and 7 show the same improvements in a horizontal instead of a vertical position, the steam-wheel $r$ being within the case $x$, and supplied with steam through the tubular pivot $v$. The shaft $s$ and coupling $t$ are in line with the shaft $u$ of the separator $q$, and this separator is cylindrical and of greater length than its diameter. This separator is similar to that before made by me.

I claim as my invention—

1. The combination, with the two-part central shaft, united by a coupling and in line with each other, of a steam-wheel upon one part of the central shaft and a device to be driven upon the other part of the shaft, and a case inclosing the steam-wheel and connected with the support for the separator, whereby the rotary movement around a common axis of both the separator and the motor results from the direct application of the steam, substantially as set forth.

2. The combination, with the two-part central shaft, united by a coupling and in line with each other, of a steam-wheel upon one part of the central shaft and a device to be driven upon the other part of the shaft, a case inclosing the steam-wheel and connected with the support for the separator, a step-formed cone, and a step-formed conical wheel for supporting the steam-wheel and device to be driven, whereby the rotary movement around a common axis of both the separator and the motor results from the direct application of the steam, substantially as set forth.

In testimony whereof I have signed my name to this specification in the presence of two subscribing witnesses.

GUSTAF DE LAVAL.

Witnesses:
LOUIS RICHARD,
J. A. BOMGREN.
*Both of Stockholm.*